(12) United States Patent
Ruml et al.

(10) Patent No.: US 7,043,321 B2
(45) Date of Patent: May 9, 2006

(54) EXCEPTION HANDLING IN MANUFACTURING SYSTEMS COMBINING ON-LINE PLANNING AND PREDETERMINED RULES

(75) Inventors: Wheeler Ruml, Palo Alto, CA (US); Robert M. Lofthus, Webster, NY (US); Ronald J. Root, Fairport, NY (US); Markus P J. Fromherz, Palo Alto, CA (US); Marc W. Webster, Rochester, NY (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 126 days.

(21) Appl. No.: 10/855,938

(22) Filed: May 27, 2004

(65) Prior Publication Data

US 2005/0278050 A1   Dec. 15, 2005

(51) Int. Cl.
*G06F 19/00* (2006.01)
(52) U.S. Cl. ........................... 700/100; 700/110
(58) Field of Classification Search ........ 700/100–103, 700/97, 99, 108–110; 714/25; 101/2
See application file for complete search history.

(56) References Cited

U.S. PATENT DOCUMENTS

| | | | | |
|---|---|---|---|---|
| 5,093,794 A * | 3/1992 | Howie et al. | ........... | 700/100 |
| 5,696,893 A | 12/1997 | Fromherz et al. | ........... | 395/112 |
| 6,216,109 B1 * | 4/2001 | Zweben et al. | ........... | 705/8 |
| 6,400,999 B1 * | 6/2002 | Kashiyama et al. | ........... | 700/100 |
| 6,604,017 B1 * | 8/2003 | Richardson et al. | ........... | 700/223 |
| 6,684,121 B1 * | 1/2004 | Lu et al. | ........... | 700/108 |
| 6,947,803 B1 * | 9/2005 | Bode et al. | ........... | 700/121 |

OTHER PUBLICATIONS

U.S. Appl. No. 10/424,322 entitled "Monitoring and Reporting Incremental Job Status System and Method", Fromherz et al., filed Apr. 28, 2003.
U.S. Appl. No. 10/424,661 entitled "Predictive and Preemptive Planning and Scheduling for Different Job Priorities System and Method" Fromherz et al., filed Apr. 28, 2003.
U.S. Appl. No. 10/424,620 entitled "Planning and Scheduling for Failure Recovery System and Method" Fromherz et al., filed Apr. 28, 2003.

* cited by examiner

*Primary Examiner*—Leo Picard
*Assistant Examiner*—Alexander Kosowski
(74) *Attorney, Agent, or Firm*—Linda M. Robb (57) ABSTRACT

A method for performing exception handling operates within a computer controlled multi-step production system for producing objects. The system includes a system controller, within which reside a planner/scheduler and module controller(s). The system controller receives a stream of object specifications for objects to be produced including the jobs to which they belong. The planner/scheduler plans and schedules the jobs incrementally, and the system controller sends commands to the module controller(s) directing production of the planned and scheduled objects by production system modules. The method includes receiving notice in the system controller of a problem situation present within the multi-step production system and halting planning for the production of subsequent objects. Plans are canceled plans for all objects that have not begun production, and all objects affected by the problem situation are marked as bad objects. The system controller planned exception handling/recovery or module controller directed exception handling/recovery is applied and normal operation is resumed.

27 Claims, 6 Drawing Sheets

EXCEPTION HANDLING IN MANUFACTURING SYSTEMS COMBINING ON-LINE PLANNING AND PREDETERMINED RULES

CROSS REFERENCE TO RELATED APPLICATIONS

The following copending applications, U.S. application Ser. No. 10/424,322, filed Apr. 28, 2003, titled "Monitoring and Reporting Incremental Job Status System and Method", U.S. application Ser. No. 10/424,661, filed Apr. 28, 2003, titled "Predictive and Preemptive Planning and Scheduling for Different Job Priorities System and Method", and U.S. application Ser. No. 10/424,620, filed Apr. 28, 2003, titled "Planning and Scheduling for Failure Recovery System and Method" are assigned to the same assignee of the present application. The entire disclosures of these copending applications are totally incorporated herein by reference in their entirety.

INCORPORATION BY REFERENCE

The following U.S. patent is fully incorporated herein by reference: U.S. Pat. No. 5,696,893 ("System for Generically Describing and Scheduling Operation of Modular Printing Machine").

BACKGROUND

This invention relates generally to the control and management of automated manufacturing systems, and more particularly to a system and method for exception handling combining on-line planning and predetermined rules.

Figure 1:
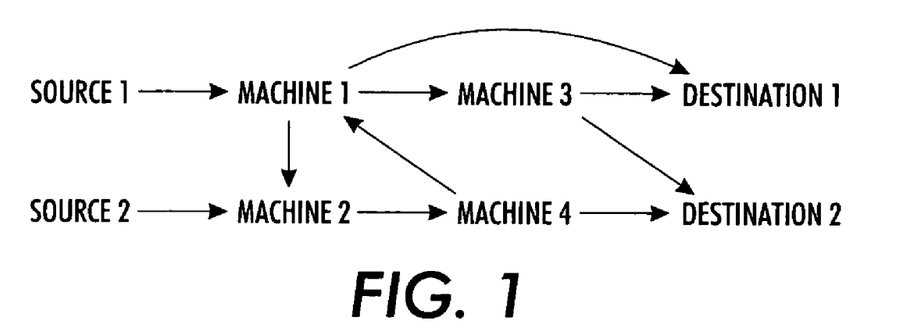
FIG. 1 is a schematic diagram of an example manufacturing plant.

Manufacturing systems conventionally require the planning and scheduling of a series of job requests, which may arrive asynchronously over time. A typical manufacturing plant may be represented as a network of transports linking multiple machines, as shown in FIG. 1. A plant may have anywhere from a few to several hundred machines and transports. Unfinished blocks of raw material may enter the plant from multiple sources and completed-jobs can exit at multiple destinations. In the simplified schematic of FIG. 1, Sources 1 and 2 provide materials to Machine 1 and Machine 2, which interface with Machine 3 and Machine 4 as well as Destinations 1 and 2.

Errors in processing in such a system may cause bad objects to flow to the system output. Bad objects are defined as objects that are in some way inconsistent with the expectations at the output, for example, they are out of order in an ordered batch, or they are incorrectly manufactured, positioned, oriented, or otherwise in violation of the original requirements for that object. Such problems are exacerbated in systems with complex processing paths and in systems in which objects from two or more independent jobs are present in the system at the same time. Where exceptions are addressed in existing systems, it is often necessary to dispose of an entire batch currently in production to avoid inconsistent output. Also, such decisions for recovery from failure are often made locally by different modules in the system, in a manner that is opaque to the system-level controller, and thus interfere with optimal decision making by the system-level controller. It is desirable for the system to have a general mechanism for preventing bad output while preserving as much of the good output as possible.

BRIEF SUMMARY

The disclosed embodiments provide examples of improved solutions to the problems noted in the above Background discussion and the art cited therein. There is shown in these examples an improved method for performing exception handling within a computer controlled multi-step production system for producing objects. The system includes a system controller, within which reside a planner/scheduler and module controller(s). The system controller receives a stream of object specifications for objects to be produced including the jobs to which they belong. The planner/scheduler plans and schedules the jobs incrementally, and the system controller sends commands to the module controller(s) directing production of the planned and scheduled objects by production system modules. The method includes receiving notice in the system controller of a problem situation present within the multi-step production system and halting planning for the production of subsequent objects. Plans are canceled plans for all objects that have not begun production, and all objects affected by the problem situation are marked as bad objects. The system controller planned exception handling/recovery or module controller directed exception handling/recovery is applied and normal operation is resumed.

There is also disclosed a system for performing exception handling within a computer controlled multi-step production system for producing objects. The system includes a system controller, within which reside a planner/scheduler and module controller(s). The system controller receives a stream of object specifications for objects to be produced including the jobs to which they belong and the planner/scheduler plans and schedules the jobs incrementally. The system controller sends commands to the module controller(s) directing production of the planned and scheduled objects by production system modules. The system controller receives notice of a problem situation present within the multi-step production system and halts planning for the production of subsequent objects. Plans for all objects that have not begun production are canceled, and all objects affected by the problem situation are marked as bad objects. Either a system controller planned exception handling/recovery or module controller directed exception handling/recovery is applied and the system resumes normal operation.

In yet another embodiment, there is disclosed an article of manufacture in the form of a computer usable medium having computer readable program code embodied in the medium, which causes the computer to perform method steps for performing exception handling within a computer controlled multi-step production system for producing objects. The system includes a system controller, within which reside a planner/scheduler and module controller(s). The system controller receives a stream of object specifications for objects to be produced including the jobs to which they belong and the planner/scheduler plans and schedules the jobs incrementally. The system controller sends commands to the module controller(s) directing production of the planned and scheduled objects by production system modules. The method includes receiving notice within the system controller of a problem situation present within the multi-step production system and halting planning for the production of subsequent objects. Plans for all objects that have not begun production are canceled and all objects affected by the problem situation are marked as bad objects. Either a system controller planned exception handling/recovery or module controller directed exception handling/recovery approach is applied and normal operation is resumed.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Disclosed herein are a method and system that perform exception handling within production environments to prevent the production of objects that are inconsistent with output expectations. To accomplish this, the method combines predetermined rules and planning to allow for the interleaving of handling exceptions locally and plan recovery in parallel. In this approach, modules of the system have predetermined exception handling rules that are modeled and exported to the system-level planner and scheduler, which takes these into account when planning the recovery and recreation of inconsistent objects. Alternatively the planner/scheduler may decide on the approach for handling all exceptions, without the use of predetermined rules. In contrast to existing approaches to scheduling, the system and method described herein does not make recovery decisions at the local module level without the knowledge of the system-level controller, as such an approach interferes with optimal decision making by the system-level controller. Also, it eliminates the need to dispose of an entire production batch to avoid inconsistent output.

The system and method apply to control software used for multi-step production processes such as manufacturing, printing, or assembly and provide for the handling of complex operations over complex paths to provide flexible routing, optimal productivity, and optimal load balancing. In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention.

Various computing environments may incorporate the exception handling method and system. The following discussion is intended to provide a brief, general description of suitable computing environments in which the concurrent planning and scheduling method and system may be implemented. Although not required, the method and system will be described in the general context of computer-executable instructions, such as program modules, being executed by a networked computer. Generally, program modules include routines, programs, objects, components, data structures, etc. that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like. The method and system may also be practiced in distributed computing environments where tasks are performed by remote processing devices that are linked through a communications network or in a centralized computing environment. In a distributed computing environment, program modules may be located in both local and remote memory storage devices.

Although the method and system described herein is not limited to embedded applications, the following discussion will pertain to embedded systems for purposes of example only. One skilled in the art will appreciate that the planning and scheduling method and system is useful for many complex control problems, generic software solutions to a wide variety of programming problems, flexible programs that separate the model from its solution, and wherever formulation as constraint problems is natural for expression of domain knowledge. Additionally, it may be practiced in a multitude of computing environments.

The exception handler has been implemented using an architecture that is adapted to an on-line domain, with the overall objective of preventing undesired output while preserving as much of the desired output as possible. The system manipulates discrete objects that belong in a certain order within a "batch" of objects. Multiple batches might be processed in the system at the same time by diverting the objects as necessary to the appropriate output destination. The system controller (planner/scheduler) remembers the proper order of the objects. System components can notify the controller when errors occur and bad objects are in the processing stream.

Figure 2:
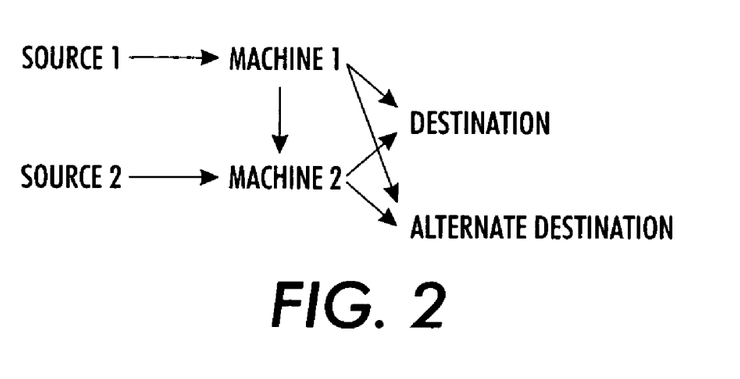
FIG. 2 is a schematic diagram of another example manufacturing plant configuration.

One example application would be an automated machining system in which blocks of metal are conveyed between drilling, lathing, and other machining stations. It may be desired for all parts for a particular customer to appear in a particular order at a single output station for assembly or packing. A second example is a cut-sheet printing system, illustrated schematically in FIG. 2, in which "print jobs" are composed of multiple "sheets" (from source 1 or source 2), which are transported to either machine 1 or machine 2 for printing, binding, folding, or other manipulation. These sheets must appear at "output trays" (destination or alternate destination) in the specified order with the specified images thereon.

Figure 3:
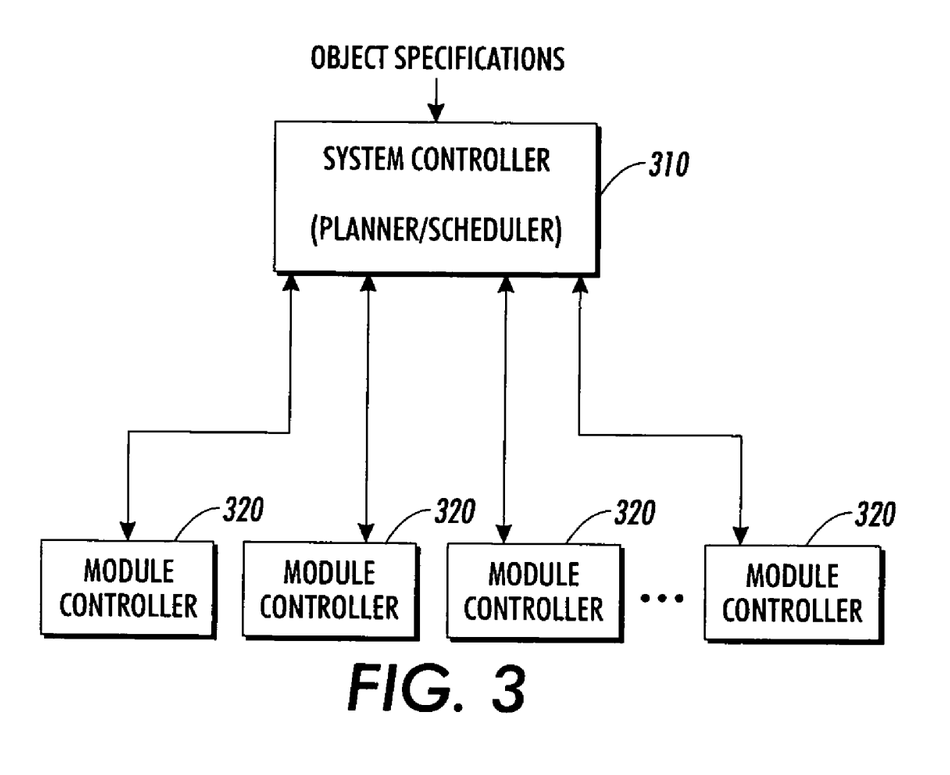
FIG. 3 is a system diagram of one embodiment of a computer system on which the system for exception handling may reside.

Turning now to FIG. 3, a system includes a system controller 310, within which resides a planner/scheduler, and one or more module controllers 320. There may be a coordinator (not shown) between the system controller 310 and the module controllers 320, which may reside within the system controller 310. The system controller receives a stream of object specifications for objects to be produced. These are planned and scheduled incrementally. Concurrently, commands for planned and scheduled objects to be produced are sent to the module controllers when appropriate. Thus, at any one point in time, there will be objects that the system controller doesn't know about yet, objects being planned and scheduled in the system that haven't been announced to the module controllers yet, and objects that have been announced to the module controllers (and for which production may or may not have been started).

Figure 5:
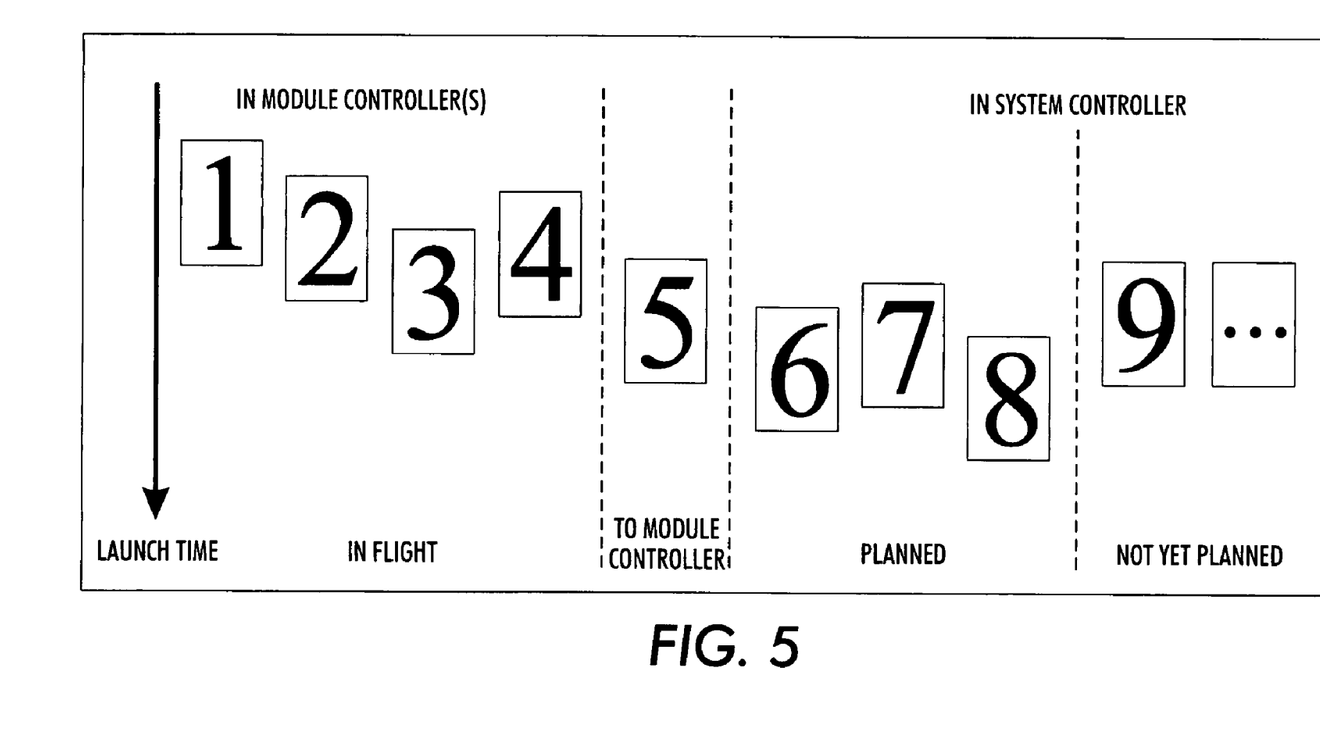
FIG. 5 illustrates the state of a sequence of objects at a specified time.

FIG. 5 illustrates the state of all objects in the system for a sample sequence. The system controller has all relevant information about objects and jobs in order to determine which objects belong to which jobs. It also remembers all plans of objects in production until these objects have been completed. As can be seen in FIG. 5, objects 9 and beyond do not yet have associated plans known to the system controller (SC). Objects 6, 7, and 8 are within the system controller and have been planned. Object 5 has been planned and is known to at least one module controller (MC), but work has not yet been initiated on it. Objects 1, 2, 3, and 4 are currently in production.

Figure 4:
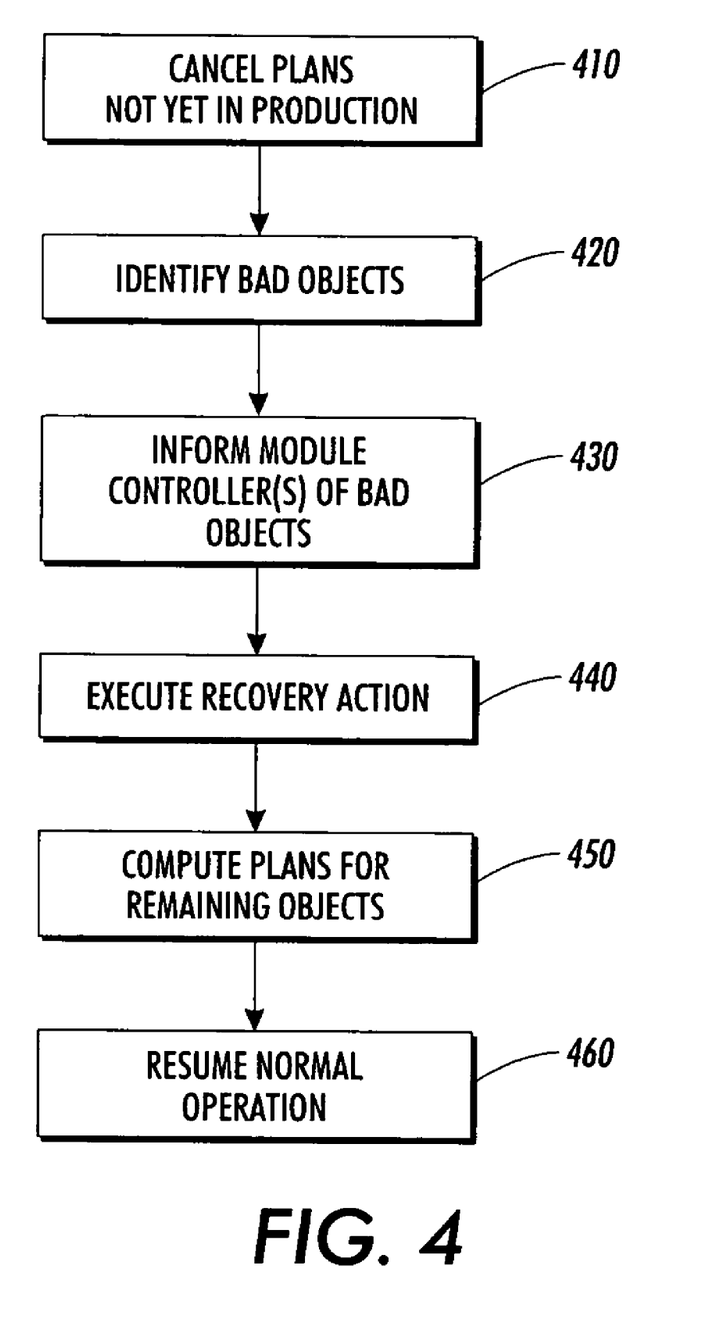
FIG. 4 provides a flow diagram detailing an example embodiment of the flow of operations to accomplish predetermined, open recovery rules interleaved with planning/scheduling of job complement.

Turning now to FIG. 4, an example embodiment of the method for utilizing predetermined, recovery rules interleaved with the planning/scheduling of job complements is illustrated. Upon receiving notice of a problem situation, the system controller stops planning the production of subsequent objects and cancels plans for all objects that have not begun production at 410. Problem situations include bad objects such as misproduced or out-of-order objects as well as issues such as out-of-paper trays and not-yet-hot-enough binding modules, to continue the example of the printing system. At 420 the system controller marks all objects that are affected by the problem situation as also bad. The system controller communicates to the module controllers the identity of those objects that are to be considered bad at 430.

For all objects declared bad, a module controller confronted with such an object executes a predetermined recovery action at 440. A predetermined action taken by a module controller may include: a) execute the original, planned action, or b) execute any of a set of alternative actions including, perhaps, the disposal of the object, thereby removing it from the system, or a repair of the object (e.g., adjusting a bad orientation). Which of these actions is to be taken by each module controller is fixed in advance, before production starts, and is known to the system controller. These actions could be modeled and made known to the system controller in a manner similar to regular module actions (capabilities) used by the system controller to plan and schedule the production of objects, together with information about the conditions for which of the actions will be taken in a particular problem situation. The system controller plans and schedules the complement of the objects that will be produced correctly by the predetermined module controller actions at 450. The system controller knows whether a module controller can dispose of the bad object, e.g., by ejecting it from the system, or whether the bad object will continue on its original course through the system. Normal operation then resumes at 460.

Figure 6:
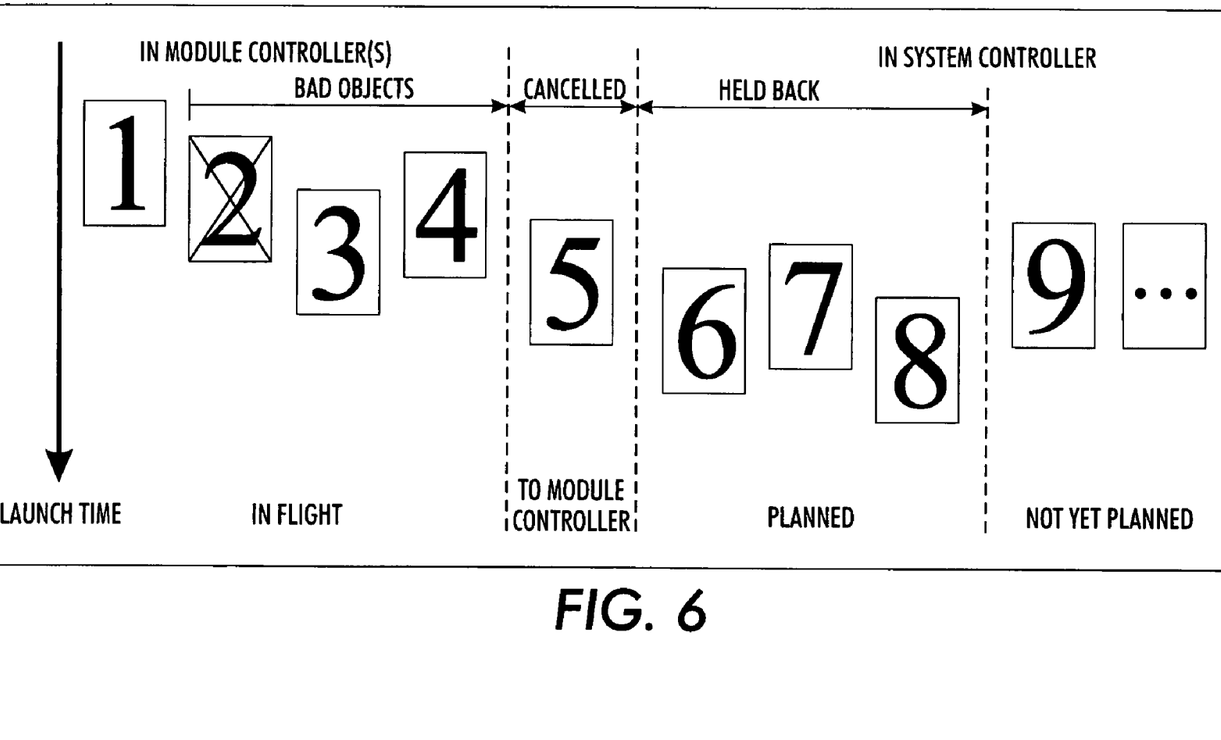
FIG. 6 illustrates the state of a sequence of objects with a problem situation.

This method is illustrated in FIG. 6, in which object 2 may fail to be produced correctly. Note that without a method for exception handling, incorrect output would ordinarily result. Following the presently disclosed method, the system controller will not announce plans for objects 6 and later that have already been planned or not yet planned to the module controllers. The system controller will cancel the plan for object 5, and will determine and communicate that objects 3 and 4 are to be considered bad as well. Objects affected by the problem situation include, for example, objects that are in the same job as the bad object and should finish after the bad object.

This method can be used to ensure that output integrity is preserved. In a cut-sheet printing system example, a purge tray may be made available at the finishing station. If the finishing station is configured to send bad sheets to the purge tray, then only a valid prefix of the desired print job will appear in the usual output tray. Because the system controller knows whether objects were removed from the system or not, it can determine whether any bad objects arrived at the usual output tray. When it is ensured that all bad objects are properly disposed of, the system controller will generate new plans for the remaining desired objects, i.e., the complement of the original, correctly produced group of ordered objects.

Another example is that of machinery for preparing and processing chemical and biological samples, in which containers of fluid are transferred from machine to machine, to be finally deposited in a particular desired order in an output tray or rack. In a complex system, in which multiple objects are in production simultaneously, it is critical that any errors which are detected during processing do not result in misordered output or require the disposal of the entire expensive batch of samples.

This approach is successful even when the original "bad object" is not in the system. Returning to the print system example, a shortage of raw stock may prevent the injection of a new object into the system. In this case the object that was planned to travel through the system will not exist. By declaring such an object "bad" the system controller can then ensure that any objects already in the system that were intended to reach the system output after the missing object will be identified and properly discarded or removed by the operator.

It is also to be noted that this method is also operable for a more complex system in which modules other than those at output locations can dispose of objects. If modules can tolerate the absence of a planned object, such as seen with item 5 illustrated in FIG. 6, then the method will result in the object being ejected as soon as it reaches the nearest module that has an ejection capability. To continue the cut-sheet printing example, purge trays may be located throughout a printer system. The above method will result in undesired sheets being stacked in the next purge tray they encounter. The system modules that had planned to receive the bad sheet are unaffected.

Further, if the manufacturing system has been designed with this method of error handling, then the alternative actions for a bad object may be set such that the bad object is not immediately disposed of but in fact takes a different route through the system before being disposed of. A simple approach to achieving this would be to include special-purpose transports that are only used for such bad-object routing, but more sophisticated designs in which mechanical or other constraints guarantee that the alternative route for the bad object will be free and available for the bad object if and when it is used are also fully contemplated by the specification and scope of the claims herein.

Figure 7:
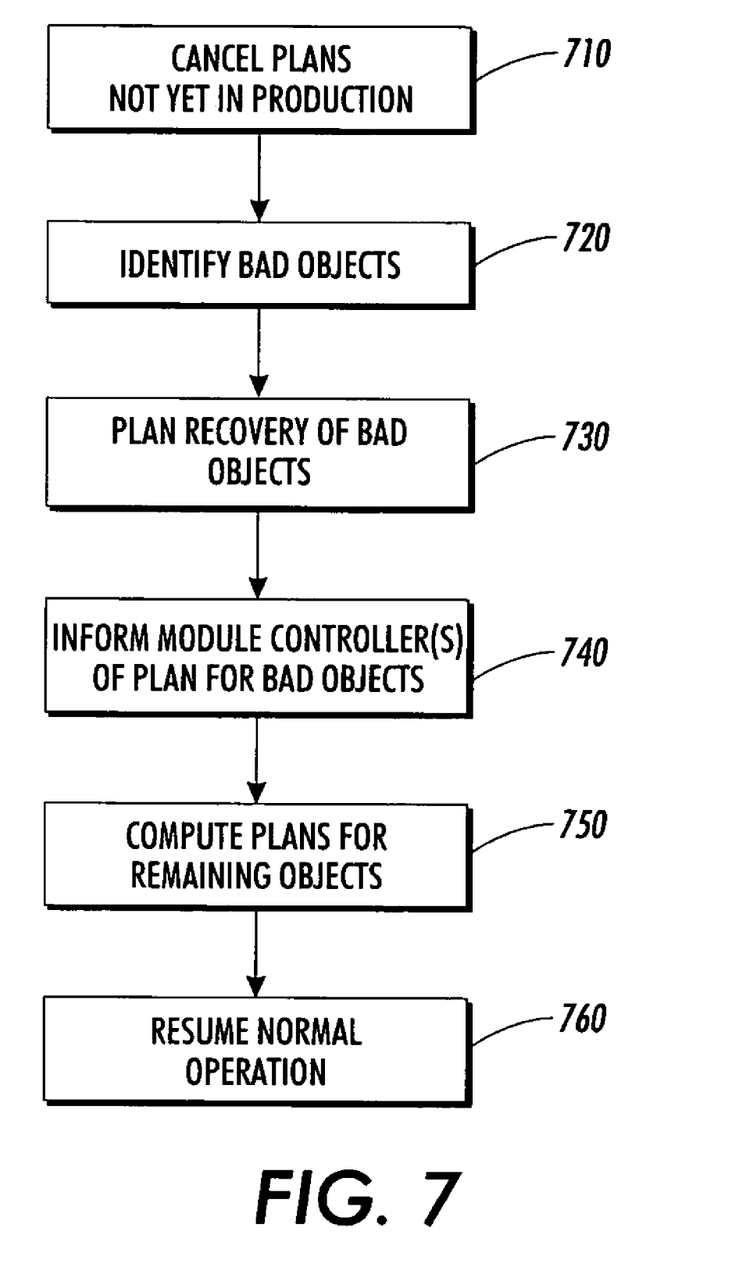
FIG. 7 provides a flow diagram detailing an example embodiment of the flow of operations to accomplish planned recovery rules interleaved with planning/scheduling of job complement.

Turning now to FIG. 7, another example embodiment of the method for utilizing planned recovery rules interleaved with the planning/scheduling of job complements is illustrated. Upon receiving notice of a problem situation, the system controller stops planning the production of subsequent objects and cancels plans for all objects that have not begun production at 710. Problem situations include bad objects such as misproduced or out-of-order objects as well as issues such as out-of-paper trays and not-yet-hot-enough binding modules, to continue the example of the multiple-engine printing system. At 720 the system controller marks all objects that are affected by the problem situation as also bad. The system controller plans the recovery of all bad objects, using predetermined module actions as appropriate at 730. As before, a predetermined action taken by a module controller may include: a) execute the original, planned action, or b) execute any of a set of alternative actions including, perhaps, the disposal of the object, thereby removing it from the system, or a repair of the object (e.g., adjusting a bad orientation). Recovery may be in the form of repair or disposal plus re-creation of objects.

In this approach, rather than relying on predetermined alternative actions alone to be taken for bad objects, the system controller can specify the action to be taken, including, perhaps, repair of the bad object, based on the model of the system that includes the capabilities and default exception handling actions of each module. Once informed of the original bad object, the system controller informs the module controllers as to which objects are to be considered bad (720). (Recall that additional objects might be required to be labeled bad besides the original bad one.) At this time, the system controller may include a specification of which action each module controller is to take upon encountering each bad object. This is an optional step in which the system controller helps the module controllers select among their predetermined actions. Rather than relying on predetermined actions alone, the system controller has the flexibility to determine appropriate actions in response to the current state of the machine. For all objects declared bad, the system controller informs the affected module controller(s) of the plan for the bad objects at 740. The system controller computes the plans and cancels and resends the plans for objects whose plans have been changed at 750. Given the models of both normal and predetermined recovery actions, the system controller knows whether a module controller can dispose of the bad object, e.g., by ejecting it from the system, or whether the bad object will continue on its original course through the system. Normal operation then resumes at 760.

Returning to the example of the printing system, it may be the case that the system was not carefully designed with exception handling in mind, and it may be impossible to find a set of predetermined rules that are guaranteed to correctly dispose of bad sheets. One can easily imagine this for printing systems that have many possible branching and rejoining paths for sheets to take. In such a system, the system controller can use any of a number of planning methods to find feasible paths for the bad sheets, depending on the state of the machine at the time. This may be particularly attractive in systems that can slow down or even stop the transport of objects in the system. The system controller may be able to purge the bad objects and create replacements while keeping all other objects "paused" in the system. Note that a variety of methods may be used in the system controller to determine the proper actions for the system.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

What is claimed:

1. A method for performing exception handling within a computer controlled multi-step production system for producing objects, wherein said system includes a system controller, within which reside a planner/scheduler and at least one module controller, wherein the system controller receives a stream of object specifications for objects to be produced including the jobs to which they belong, wherein the planner/scheduler plans and schedules the jobs incrementally, and wherein the system controller sends commands to the at least one module controller directing production of the planned and scheduled objects by production system modules, the method comprising:

receiving notice in the system controller of a problem situation present within the multi-step production system, wherein said problem situation includes at least one member selected from the group consisting of equipment operational issues and bad objects, wherein said bad objects include misproduced, out-of-order, or missing objects;

halting planning for the production of subsequent objects;

canceling plans for all objects that have not begun production;

marking all objects affected by said problem situation as bad objects;

applying at least one of system controller planned exception handling/recovery or module controller directed exception handling/recovery, wherein said system controller planned exception handling/recovery comprises:

specifying by the system controller the recovery plan based on a model of the production system, wherein said model includes the capabilities and default exception handling actions of each module in the production system;

informing the at least one module controller of the identity of said bad objects;

informing the affected at least one module controller of said recovery plan for said bad objects; and computing the plans and canceling and resending the plans for objects whose plans have been changed; and resuming normal operation.

2. The method for performing exception handling within a computer controlled multi-step production system according to claim 1, wherein module controller directed exception handling/recovery comprises:

communicating from the system controller to the at least one module controller the identity of objects considered bad;

executing at least one module controller predetermined recovery action for the objects considered bad, wherein said predetermined recovery action are modeled and made known to the system controller together with information about the conditions for which the actions will be taken in a particular problem situation prior to the start of production; and planning and scheduling by the system controller of the complement of the objects that will be produced correctly by said at least one predetermined recovery action.

3. The method for performing exception handling within a computer controlled multi-step production system according to claim 2, wherein said predetermined recovery action comprises execution of a single planned action.

4. The method for performing exception handling within a computer controlled multi-step production system according to claim 2, wherein said predetermined recovery action comprises execution of any of a set of alternative actions including disposal of said bad object from the production system or repair of said bad object.

5. The method for performing exception handling within a computer controlled multi-step production system according to claim 4, wherein disposal of said bad object comprises ejection by a production system module.

6. The method for performing exception handling within a computer controlled multi-step production system according to claim 4, wherein disposal of said bad object comprises direction of said bad object along an alternate route through the production toward a disposal point.

7. The method for performing exception handling within a computer controlled multi-step production system according to claim 4, wherein repair of said bad object comprises adjusting an incorrect orientation on the production line.

8. The method for performing exception handling within a computer controlled multi-step production system according to claim 1, further including specifying which action is to be taken by each production module upon encountering each said bad object.

9. The method for performing exception handling within a computer controlled multi-step production system according to claim 1, wherein recovery of said bad objects comprises repair of said bad objects or disposal of said bad objects.

10. The method for performing exception handling within a computer controlled multi-step production system according to claim 1, wherein the production system further comprises a coordinator module interfacing with the system controller and the at least one module controller.

11. The method for performing exception handling within a computer controlled multi-step production system according to claim 1, wherein the production system comprises a printing system.

12. The method for performing exception handling within a computer controlled multi-step production system according to claim 1, wherein the production system comprises a manufacturing system.

13. The method for performing exception handling within a computer controlled multi-step production system according to claim 1, wherein the production system comprises an assembly line.

14. A system for performing exception handling within a computer controlled multi-step production system for producing objects, wherein said system includes a system controller, within which reside a planner/scheduler and at least one module controller, wherein the system controller receives a stream of object specifications for objects to be produced including the jobs to which they belong, wherein the planner/scheduler plans and schedules the jobs incrementally, and wherein the system controller sends commands to the at least one module controller directing production of the planned and scheduled objects by production system modules, the system comprising:
    means for receiving notice within the system controller of a problem situation present within the multi-step production system, wherein said problem situation includes at least one member selected from the group consisting of equipment operational issues and bad objects, wherein said bad objects include misproduced, out-of-order, or missing objects;
    means for halting planning for the production of subsequent objects;
    means for canceling plans for all objects that have not begun production;
    means for marking all objects affected by said problem situation as bad objects;
    means for applying at least one of system controller planned exception handling/recovery or module controller directed exception handling/recovery, wherein said means for applying at least one system controller planned exception handling/recovery comprises:
        means for specifying by the system controller the recovery plan based on a model of the production system, wherein said model includes the capabilities an default exception handling actions of each module in the production system;
        means for informing the at least one module controller of the identity of said bad objects;
        means for informing the affected at least one module controller of said recovery plan for said bad objects; and
        means for computing the plans and canceling and resending the plans for objects whose plans have been changed; and
    means for resuming normal operation.

15. The system for performing exception handling within a computer controlled multi-step production system according to claim 14, wherein module controller directed exception handling/recovery comprises:
    means for communicating from the system controller to the at least one module controller the identity of objects considered bad;
    means for executing at least one module controller predetermined recovery action for the objects considered bad, wherein said predetermined recovery action are modeled and made known to the system controller together with information about the conditions for which the actions will be taken in a particular problem situation prior to the start of production; and
    means for planning and scheduling by the system controller of the complement of the objects that will be produced correctly by said at least one predetermined recovery action.

16. The system for performing exception handling within a computer controlled multi-step production system according to claim 15, wherein said predetermined recovery action comprises execution of a single planned action.

17. The system for performing exception handling within a computer controlled multi-step production system according to claim 15, wherein said predetermined recovery action comprises execution of any of a set of alternative actions including disposal of said bad object from the production system or repair of said bad object.

18. The system for performing exception handling within a computer controlled multi-step production system according to claim 17, wherein disposal of said bad object comprises ejection by a production system module.

19. The system for performing exception handling within a computer controlled multi-step production system according to claim 17, wherein disposal of said bad object comprises direction of said bad object along an alternate route through the production toward a disposal point.

20. The system for performing exception handling within a computer controlled multi-step production system according to claim 17, wherein repair of said bad object comprises adjusting an incorrect orientation on the production line.

21. The system for performing exception handling within a computer controlled multi-step production system according to claim 14, further including specifying which action is to be taken by each production module upon encountering each said bad object.

22. The system for performing exception handling within a computer controlled multi-step production system according to claim 14, wherein recovery of said bad objects comprises repair of said bad objects or disposal of said bad objects.

23. The system for performing exception handling within a computer controlled multi-step production system according to claim 14, wherein the production system further comprises a coordinator module interfacing with the system controller and the at least one module controller.

24. The system for performing exception handling within a computer controlled multi-step production system according to claim 14, wherein the production system comprises a printing system.

25. The system for performing exception handling within a computer controlled multi-step production system according to claim 14, wherein the production system comprises a manufacturing system.

26. The system for performing exception handling within a computer controlled multi-step production system according to claim 14, wherein the production system comprises an assembly line.

27. An article of manufacture comprising a computer usable medium having computer readable program code embodied in said medium which, when said program code is executed by the computer causes the computer to perform method steps for performing exception handling within a computer controlled multi-step production system for producing objects, wherein said system includes a system controller, within which reside a planner/scheduler and at least one module controller, wherein the system controller receives a stream of object specifications for objects to be produced including the jobs to which they belong, wherein the planner/scheduler plans and schedules the jobs incrementally, and wherein the system controller sends commands to the at least one module controller directing production of the planned and scheduled objects by production system modules, the method comprising:

receiving notice within the system controller of a problem situation present within the multi-step production system, wherein said problem situation includes at least one member selected from the group consisting of equipment operational issues and bad objects, wherein said bad objects include misproduced, out-of-order, or missing objects;

halting planning for the production of subsequent objects;

canceling plans for all objects that have not begun production;

marking all objects affected by said problem situation as bad objects;

applying at least one of system controller planned exception handling/recovery or module controller directed exception handling/recovery, wherein said system controller planned exception handling/recovery comprises:

specifying by the system controller the recovery plan based on a model of the production system, wherein said model includes the capabilities and default exception handling actions of each module in the production system;

informing the at least one module controller of the identity of said bad objects;

informing the affected at least one module controller of said recovery plan for said bad objects; and computing the plans and canceling and resending the plans for objects whose plans have been changed; and resuming normal operation.

\* \* \* \* \*